United States Patent [19]
Redman

[11] Patent Number: 5,398,130
[45] Date of Patent: Mar. 14, 1995

[54] GRADIENT INDEX LENS PHASED ARRAY PHASE COMPENSATION TECHNIQUE AND APPARATUS

[75] Inventor: Brian C. Redman, Alexandria, Va.

[73] Assignee: The United States of America as represented by the Secretary of the Army, Washington, D.C.

[21] Appl. No.: 983,902

[22] Filed: Dec. 1, 1992

[51] Int. Cl.⁶ .......................................... H04B 10/00
[52] U.S. Cl. .................................. 359/155; 359/191; 359/161; 356/5.01; 356/354; 250/201.9
[58] Field of Search .............. 359/110, 155, 161, 191, 359/189; 356/5, 354; 250/201.9; 372/29, 33

[56] References Cited

U.S. PATENT DOCUMENTS

| | | | |
|---|---|---|---|
| 3,731,103 | 5/1973 | O'Meara | 359/155 |
| 3,764,213 | 10/1973 | O'Meara | 359/155 |
| 4,906,092 | 3/1990 | O'Meara | 359/155 |
| 5,253,073 | 10/1993 | Crowley | 359/132 |
| 5,278,687 | 1/1994 | Jannson | 359/125 |

OTHER PUBLICATIONS

C. L. Hayes et al; Experimental Test of an Infrared Phase Conjugation Adaptive Array; Mar. 1977; J. Opt. Soc. Am. vol. 67, No. 3; pp. 269–277.

Primary Examiner—Leslie Pascal
Attorney, Agent, or Firm—Milton W. Lee; John E. Holford; Alain L. Bashore

[57] ABSTRACT

A phase compensation technique and apparatus utilizes a laser transmitter, acousto-optic/electro-optic modulators and a GRIN lens array to send out and receive phase shifted laser beams. Turbulence and optical phase distortions are compensated on outgoing and received wavefronts utilizing signal processing of the detected, mixed received and local oscillator beams.

5 Claims, 2 Drawing Sheets

GRADIENT INDEX LENS PHASED ARRAY PHASE COMPENSATION TECHNIQUE AND APPARATUS

BACKGROUND OF THE INVENTION

1. Field of the Invention

The present invention generally relates to techniques and systems for providing compensation of phase distortions for a transmitted beam and more specifically, to a multiple aperture phased array (PHASAR) phase compensation technique and apparatus.

2. Description of Prior Art

The minimization or elimination of time-varying distortions is crucial in the design of sensor systems, especially coherent (active laser) systems. Intensity and phase are the two quantities that can be controlled in active laser systems and these quantities are considered with respect to performance of such systems. Since phase distributions within an optical system have a substantially greater impact on performance than intensity, techniques and apparatus for providing compensation of phase distortions have been of interest in the prior art. Phase distortions are induced on laser wave fronts by commonly encountered phenomena such as atmospheric disturbance or inherent optical limitations.

Optical limitations and atmospheric effects affect sensor performance by causing random phase distortions whereby there is a reduction in a transmitted beam's field transverse coherence length which causes the beam divergence to be greater than the diffraction-limited divergence. For NIR, the transverse field coherence length can be as small as a few millimeters for ranges of a few kilometers on horizontal paths in moderate to strong turbulence. Thus, the aperture spacing for a multiple aperture phase compensation system should be on the order of one millimeter. Multiple aperture systems using AO/EO phase shifters and conventional lenses have difficulty in meeting this requirement on aperture spacing. In addition, conventional optics implementation would be complex, fragile, and subject to misalignment problems.

Coherent optical adaptive techniques (COAT) have been applied as a technique to minimize phase distortions from atmospheric disturbances. A COAT system generally tries to determine the phase distortions automatically in real time and apply a time-dependent "predistortion" to the transmitted beam wave front so that the net result after propagation through the atmosphere is a diffraction-limited wavefront, including time-varying distortions. COAT systems can be classified as outgoing-wave and return-wave systems. In an outgoing wave system the energy on a target is measured directly by a detector in the target plane, or indirectly by a detector in the transmitter plane receiving the scattered laser radiation from a target. A servo-loop changes the wavefronts of the outgoing wave to maximize the energy on the target. In a return-wave system the phase distortions are measured at the transceiver using: target glint returns, or a beacon laser on the target for heterodyne phase conjugate systems, or scattered laser radiation, or scattered broadband radiation, or target self-emission for compensated imaging systems. COAT systems are at a disadvantage since the target is required to be cooperative, i.e. have a glint, beacon laser, or some other type of coherent energy emission.

In 1977 C. L. Hayes et al disclosed an experimental test in the Journal of the Optical Society of America, Volume 67, No. 3, pages 269–277, to a type of COAT system called an infrared phase conjugated adaptive array. This system not only compensated for phase distortions on the outgoing wavefront to maximize energy on a target, but also compensated for phase distortions on the return wavefront. In their system there are two feedback loops for phase control. One loop controlled the outgoing wavefront's phase to insure that the phase conjugate of the received wavefront was transmitted. The other loop adjusted the phase of the received signal in each channel so that they were equal to each other. This allowed the coherent summation of the received signals from each channel. This system also suffers from the same disadvantage as other COAT systems noted above.

While the prior art has reported using techniques and apparatus to minimize phase distortions none have established a basis for a specific technique and apparatus that is dedicated to the task of resolving the particular problem at hand.

What is needed in this instance is a technique and apparatus that will substantially compensate for temporal distortions, such as due to optical aberrations, atmospheric distortions, and speckle for transmitted signals for an extended target with and without a glint point or beacon laser.

SUMMARY OF THE INVENTION

It is therefore the object of the invention to provide an apparatus and technique that will substantially compensate for temporal distortions, such as due to optical aberrations, atmospheric distortions, and speckle for transmitted signals for an extended target without a glint point or beacon laser.

According to the invention, a phase compensation technique and apparatus utilizes a phase compensation loop on an outgoing wavefront incorporating a phase shifting algorithm to compensate for turbulence effects. A GRIN lens array allows for minimum aperture spacing to compensate for field transverse coherence. Another phase shifting algorithm is used for received intermediate frequency signals. A mixed outgoing signal and mixed received signal are processed to obtain a comparison of coherently summed mixed received signals with a corresponding summed channel. Modulator driver frequencies are determined for each channel based on the comparison to provide phase distortion compensation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The phase compensation technique utilizes a phase shifting technique for the transmitted wavefront whereby the phase of the transmitted wavefront is:

$$\begin{aligned}\Phi_{xmti+1} &= \Phi_{xmt0} + \delta\Phi_{i+1} \\ &= \Phi_{ref} - \theta_{trbi} + (-1)^{i+1} \cdot \\ &\quad \left[\tfrac{1}{2} \cdot \delta\theta_{spk0} + \sum_{j=1}^{i} (-1)^{j} \cdot \theta_{spkj}\right]\end{aligned}$$

where $\Phi_{ref}$=reference phase
$\Theta_{trb}$=the one-way turbulence phase distortion
$\Theta_{spk}$=the speckle phase distortion
and the phase of the wave front incident on the target is:

$$\Phi_{inci+1} = \Phi_{ref} + (-1)^{i+1} \cdot \left[\tfrac{1}{2} \cdot \delta\theta_{spk0} + \sum_{j=1}^{i} (-1)^{j} \cdot \theta_{spkj}\right]$$

This method eliminates the turbulence phase distortion (but not speckle phase distortion) on the outgoing wavefront for an extended target without the use of a glint reflection or a beacon laser located at the target position. The target is illuminated with a speckle pattern rather than a uniform spot.

For a glint target, the phase distortion on the outgoing beam will be compensated if the initial phase shift is:

$$\delta\Phi_1 = (\Phi_{ref} - \Phi_{rcv0}) + (\Phi_{ref} - \Phi_{xmt0})$$

and if, $$\delta\Phi_{i+1} = (\Phi_{ref} - \Phi_{rcvi}) + (\Phi_{ref} - \Phi_{xmt0})$$

where $\Phi_{xmti}$=the $i^{th}$ transmitted wavefront's phase
$\Phi_{rcvi}$=the $i^{th}$ received wavefront's phase If the reference phase is spatially constant (i.e., a plane wavefront), then the wavefront incident on the target is a converging spherical wave. The phase compensation technique utilizes a prior art phase shifting technique for the received intermediate frequency (i.f.) signal which is described later.

Figure 1:
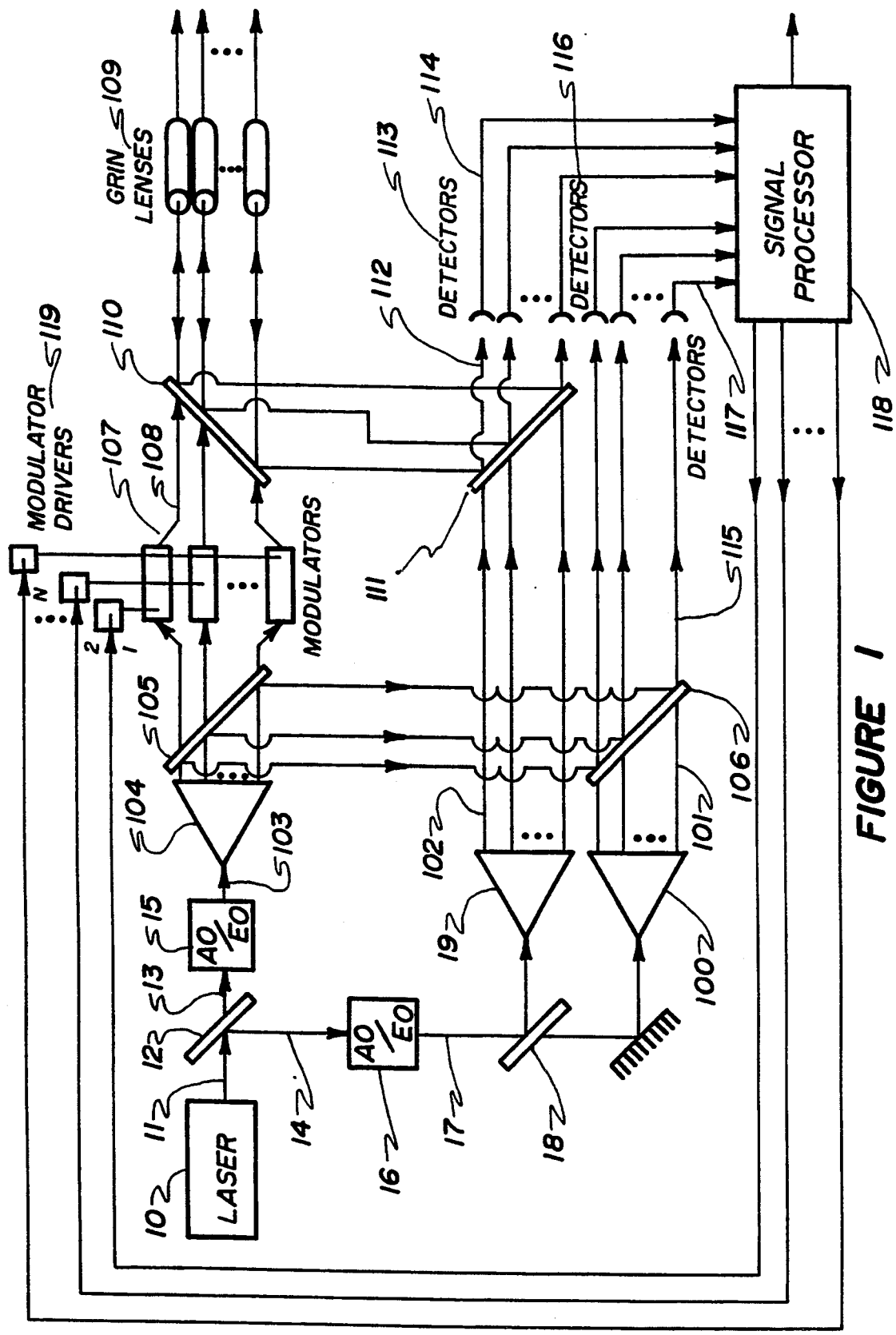
FIG. 1 is a block diagram of the overall invention.

Referring now to the drawings, and more particularly to FIG. 1, there is shown in block diagram the components of the system of the preferred embodiment. A NIR laser beam and NIR laser sensor is utilized in the preferred embodiment but it is understood that the invention is not limited to a specific part of the electromagnetic spectrum. It is understood that in other spectral regimes the hardware components will be different such as ferrite phase shifters and antennas for the microwave regime. Laser 10 emits beam 11 which is split by splitter 12 into a transmitter beam 13 and local oscillator (LO) beam 14. Transmitter beam 13 and LO beam 14 are frequency shifted by acousto-optic/electro-optic modulators (well known in the art) 15 and 16 respectively. Shifted LO beam 17 is split into two beams by optic splitter 18 and each of these beams are split into N beams by means of splitters 19 and 100 to form multiple shifted LO beams 101 and 102. It is understood that the invention is not limited to a specific number of N channels, but that what is described herein is multichannel.

Shifted transmitted beam 103 is split into N beams by optic splitter 104 and then split again by beam splitter 105 such that one of the beams is mixed at beam splitter 106 with LO beam 101 and the other is sent through an AO/EO phase modulator 107. Phase shifted beam 108 is sent out through GRIN lens array 109 to a target. The use of a GRIN lens array where each channel is fed through a corresponding GRIN lens allows for minimum aperture spacing due to the small physical makeup of each GRIN lens. The reflected wave from the target reenters lens array 109 and is diverted by beam splitter 110 to be mixed with LO beam 102 at beam splitter 111 to produce a mixed received beam 112. Mixed received beam 112 is sent to detector array 113 as electrical signal 114 and mixed outgoing signal 115 is sent to detector array 116 as electrical signal 117. Both electrical signals 114 and 117 are then sent to signal processor 118.

Figure 2:
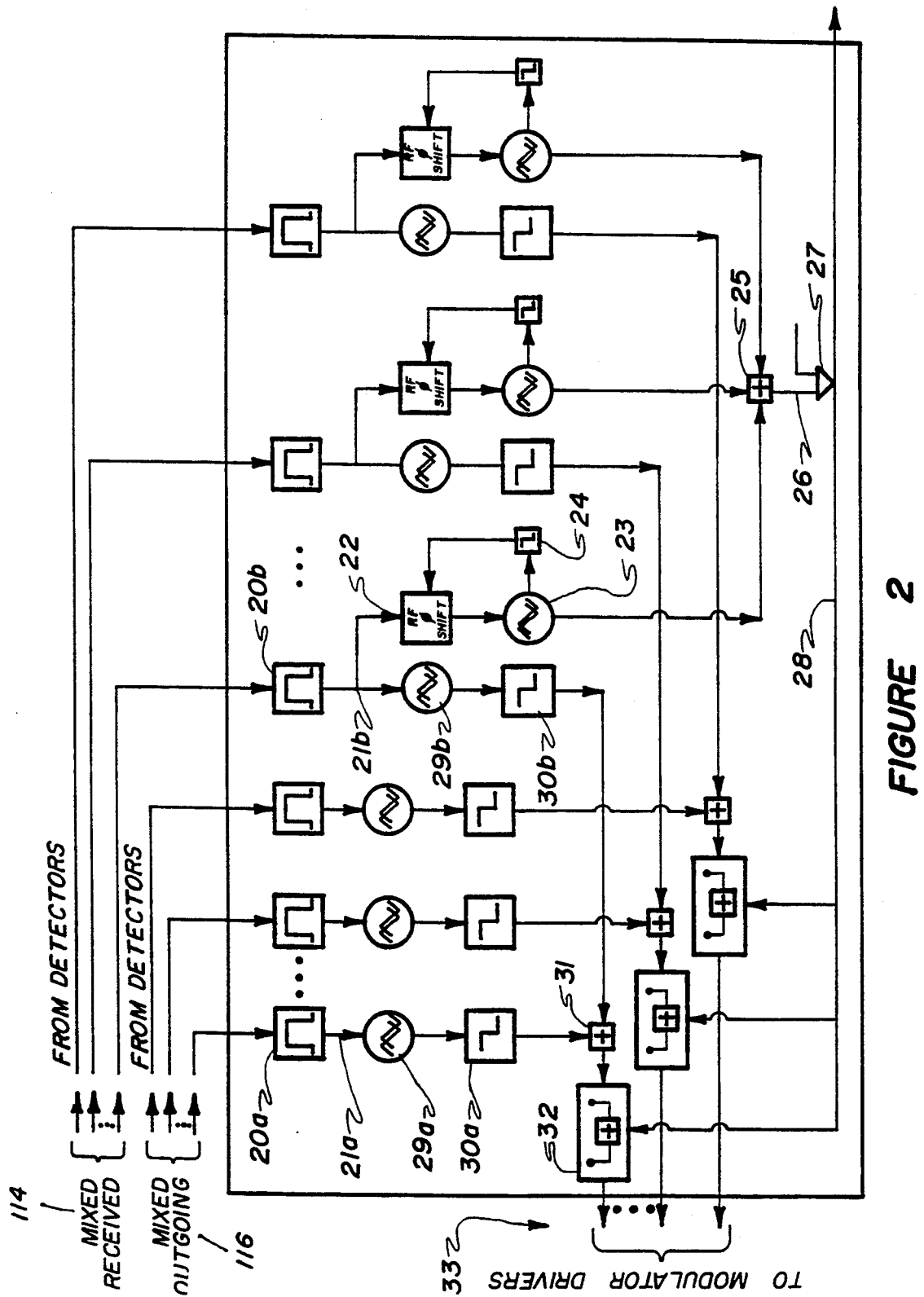
FIG. 2 is a block diagram of the signal processor of FIG. 1.

FIG. 2 shows the block diagram for signal processor 118 of FIG. 1. Mixed outgoing signal 114 from detector array 113 and mixed received electrical signal 115 from detector array 116 of FIG. 1 is bandpass filtered through bandpass filters 20a and 20b respectively as shown in FIG. 2 so as to pass only i.f. signal 21a an 21b respectively. I.f. signal 21b is split by RF splitter to send part of the received signal to voltage controlled variable RF phase shifter 22 after which the signal is sent on to phase detectors 23. The other input to the phase detector is from a reference RF generator (not shown).

The phase detectors utilized are linear over the interval (n,n+2 pi) characterized as "sawtooth". The voltage output by the i th phase detector after low pass filtering is:

$$V_i = A'(\delta\Phi i - \pi)/\pi$$

where

A=the clipping amplitude of the limiters
$\delta\Phi i$=the difference in phase between the reference and the signal.

Phase detector output is low pass filtered by low pass filters 24 to control voltage controlled RF phase shifters 22. The voltage applied to phase shifters 23 is such that a positive voltage causes a negative phase shift proportional to the voltage and vice versa. In this way the phases of i.f. signal 21b in each channel are held fixed at the same phase which differs from the RF reference phase by pi.

For moving targets, a doppler tracking loop (not shown) must be added to lock the frequency of the received i.f. signal to the frequency of the RF reference signal. It is understood that while such a modification is not further described, such a modification is within the scope of this invention. While the preferred embodiment has been described utilizing optical fibers, fiber optic couplers, phase shifters, and AO/EO cells, it is understood that these elements may be replaced by their equivalent integrated optical devices so as to be within the scope of the invention.

The other part of the phase shifted received i.f. signal is sent to summer 25. All of the received i.f. signals from phase detectors 23 are thus added in phase. This coherently summed received i.f. referred to as COSUM signal 26 is the received carrier. In COSUM receiver 27, the COSUM signal 26 is compared to a threshold level to determine whether or not the target is a glint target if the signal is above the threshold, the target is considered to be a glint. Receiver 27 outputs signal 28 which is used to control switches 32 described next.

The other part of i.f. signal 21b along with i.f. signal 21a are each individually sent to phase detectors 29b and 29a with the RF reference wave at the other input (not shown). After low pass filtering the voltage through low pass filters 30b and 30a the signals are sent to each corresponding summer 31 for each channel as shown in FIG. 2. Each summer output goes to high speed switch 32 that switches in a voltage-divide-by-two operation for the initial phase shift for the outgoing wave for a speckle target as required by the phase shifting algorithm. Switch 32 switches out the voltage-divide-by-two operation for subsequent iterations of the phase shift loop for the outgoing wave. Switch 32 also receives a control signal 28 from COSUM receiver 27 to prevent switching in the divide-by-two operation when the return signal is above the threshold indicating the present of a glint target. Output voltage 33 after switch 32 is sent to the corresponding modulator 119 of FIG. 1 that controls the AO/EO phase modulator 107 of FIG. 1 for the corresponding channel of the outgoing wave.

The invention provides a compact, robust, lightweight, and cost effective phase compensation technique and apparatus for optical transmitters and sensors. The invention will allow NIR solid-state laser sensors to perform dramatically better in the presence of atmospheric turbulence for long range applications with uncooperative targets without increasing costs inordinately.

While this invention has been described in terms of preferred embodiment consisting of a multiple aperture PHASER phase compensation technique and apparatus, those skilled in the art will recognize that the invention can be practiced with modification within the spirit and scope of the appended claims.

Having thus described my invention, what I claim as new and desire to secure by Letters Patent is as follows:

1. A multiple aperture phased array phase compensation technique for use with sensors including:
    providing a multichannel signal;
    shifting the phase of each channel of said multichannel signal to yield a phase shifted multichannel signal;
    sending said phase shifted multichannel signal through a multiple aperture array as a transmitted wavefront incident to an extended target;
    providing a reference phase signal;
    receiving a reflected signal through said multiple aperture array from said extended target, having a phase shift indicative of phase distortions of said transmitted signal due to optical aberrations, atmospheric distortions and speckle;
    mixing said reflected signal with said multichannel signal to obtain a mixed received multichannel signal;
    mixing said multichannel signal and phase shifted multichannel signal to obtain a mixed outgoing multichannel signal;
    detecting said mixed received multichannel signal and mixed outgoing multichannel signal to output a mixed received multichannel electrical signal and a mixed outgoing multichannel electrical signal;
    filtering said mixed received and mixed outgoing multichannel electrical signals to obtain mixed received intermediate frequency multichannel electrical signals and mixed outgoing intermediate frequency multichannel electrical signals;
    holding said filtered mixed received intermediate frequency multichannel electrical signal of each channel fixed at a same phase which differs from said reference phase by pi to obtain a fixed phase mixed received multichannel electrical signal;
    coherently summing each corresponding channel of said fixed phase mixed received multichannel electrical signal to obtain a coherently summed mixed received electrical signal;
    detecting the phase for said mixed outgoing multichannel electrical signal and mixed received multichannel electrical signals to yield a phase detected mixed outgoing electrical signal and phase detected mixed received electrical signal;
    filtering said phase detected mixed outgoing multichannel electrical signal and phase detected mixed received multichannel electrical signal to yield a filtered mixed outgoing multichannel electrical signal and filtered mixed received multichannel electrical signal;
    summing each corresponding channel of said filtered mixed outgoing multichannel electrical signal and filtered mixed received multichannel electrical signals to obtain summed electrical channels;
    comparing said coherently summed mixed received electrical signal with each corresponding summed electrical channel for determining corresponding modulation driver frequencies;
    modulating said transmitted wavefront signal with said corresponding modulation driver frequencies for each channel to provide phase distortion compensation.

2. The multiple aperture phased array phase compensation technique of claim 1 wherein said signals are near infrared.

3. The multiple aperture phased array phase compensation technique of claim 1 wherein said signals are microwave.

4. A multiple aperture phased array phase compensation apparatus for sensors including:
    means for producing a signal;
    means for producing a local oscillator signal;
    means for producing a multichannel signal from said signal;
    means for producing a multichannel local oscillator signal from said local oscillator signal identical to the multichannel signal;
    means for splitting said multichannel signal to yield a split multichannel signal identical to said multichannel signal;
    means for splitting said multichannel local oscillator signal to yield a split multichannel local signal identical to said multichannel local oscillator signal;
    phase shifting means for phase shifting said multichannel signal at corresponding modulation diver frequencies as a transmitted wavefront incident to a target without use of a glint reflection or beacon laser and output a mixed outgoing signal;
    multiple aperture means for transmitting said transmitted wavefront and receiving a received signal through each channel, whereby a sufficient transverse field coherence length is maintained;
    means for mixing said received signal with said multichannel local oscillator signal to obtain a mixed received multichannel signal;
    means for mixing said split local oscillator multichannel signal and multichannel signal to obtain a mixed outgoing multichannel signal;
    means for detecting said mixed received multichannel signal and mixed outgoing multichannel signal to output a mixed received multichannel electrical signal and a mixed outgoing multichannel electrical signal;

signal processing means for processing said mixed outgoing multichannel electrical signal and said mixed received multichannel electrical signal so as to determining corresponding modulation driver frequencies for each channel to control said phase shifting means whereby substantial compensation of phase distortion results.

5. The multiple aperture phased array phase compensation apparatus of claim 4 wherein said multiple aperture means is a gradient index lens array.

* * * * *